Figure 1:
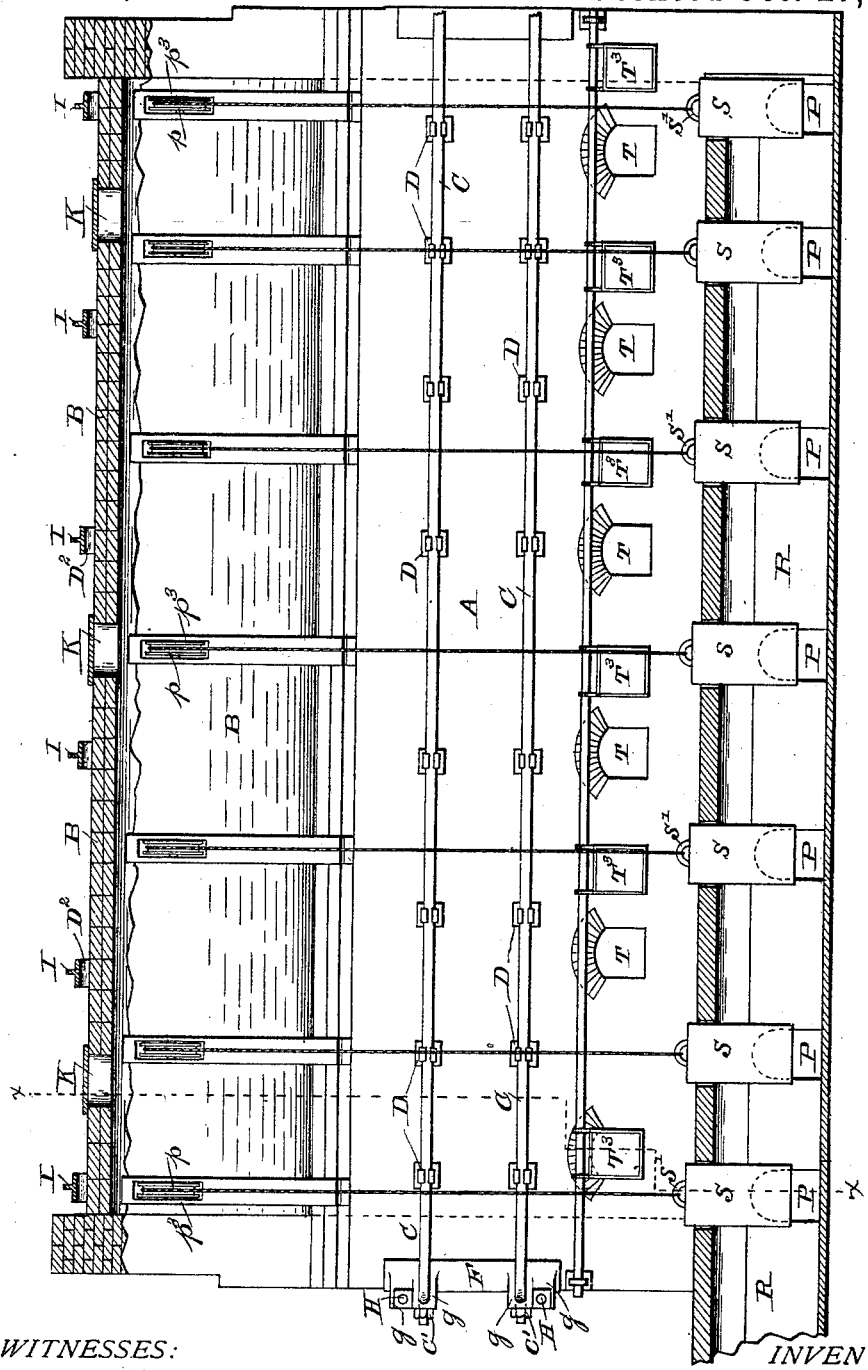

(No Model.) W. L. GREGG, Dec'd. 5 Sheets—Sheet 1.
H. L. GREGG, Executrix.
BRICK KILN.

No. 462,215. Patented Oct. 27, 1891.

WITNESSES:
Jos H Blackwood
Albert B Blackwood

INVENTOR
William L. Gregg
by Wm H Doolittle
ATTORNEY

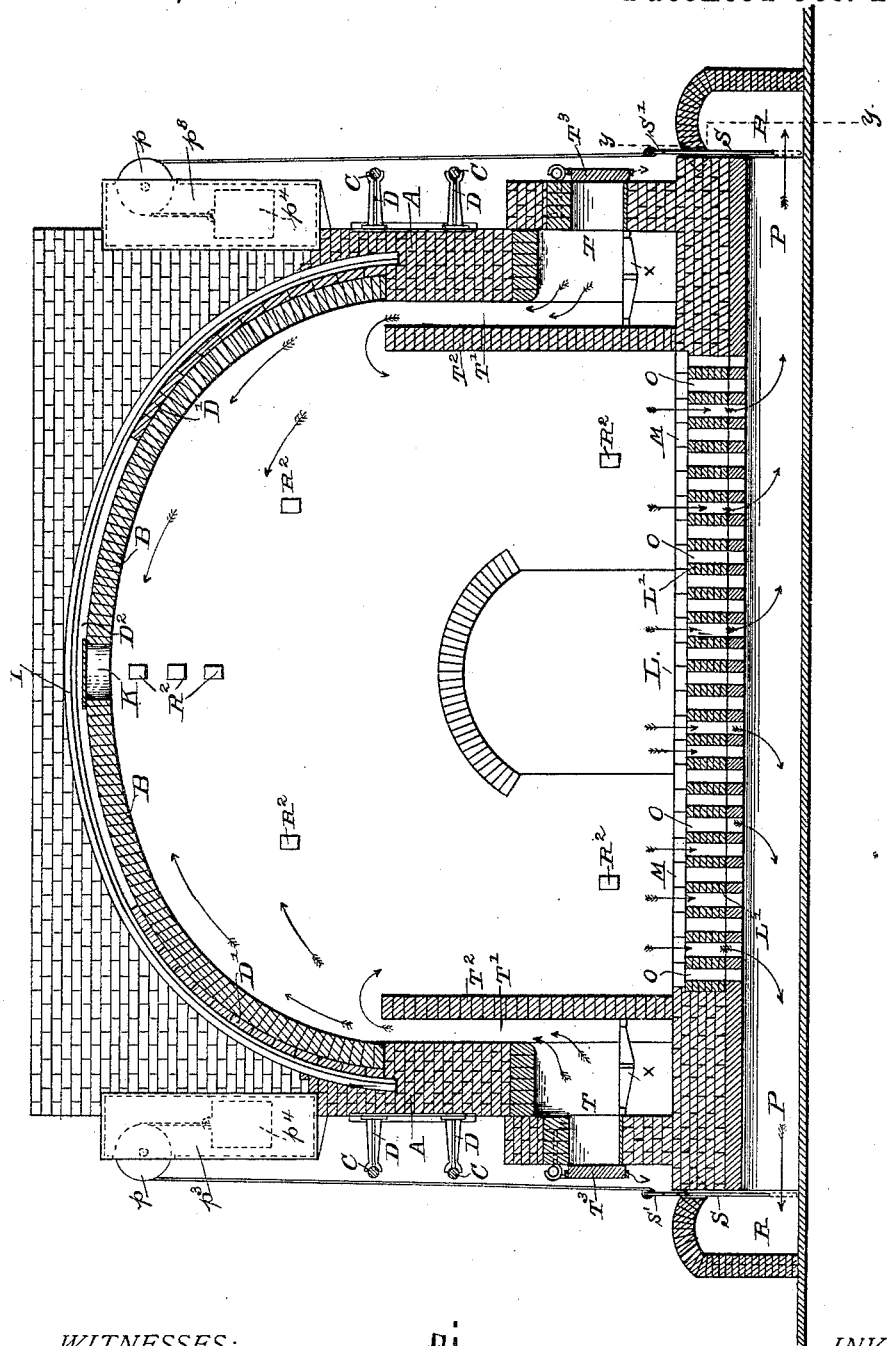

(No Model.) W. L. GREGG, Dec'd. 5 Sheets—Sheet 3.
H. L. GREGG, Executrix.
BRICK KILN.
No. 462,215. Patented Oct. 27, 1891.
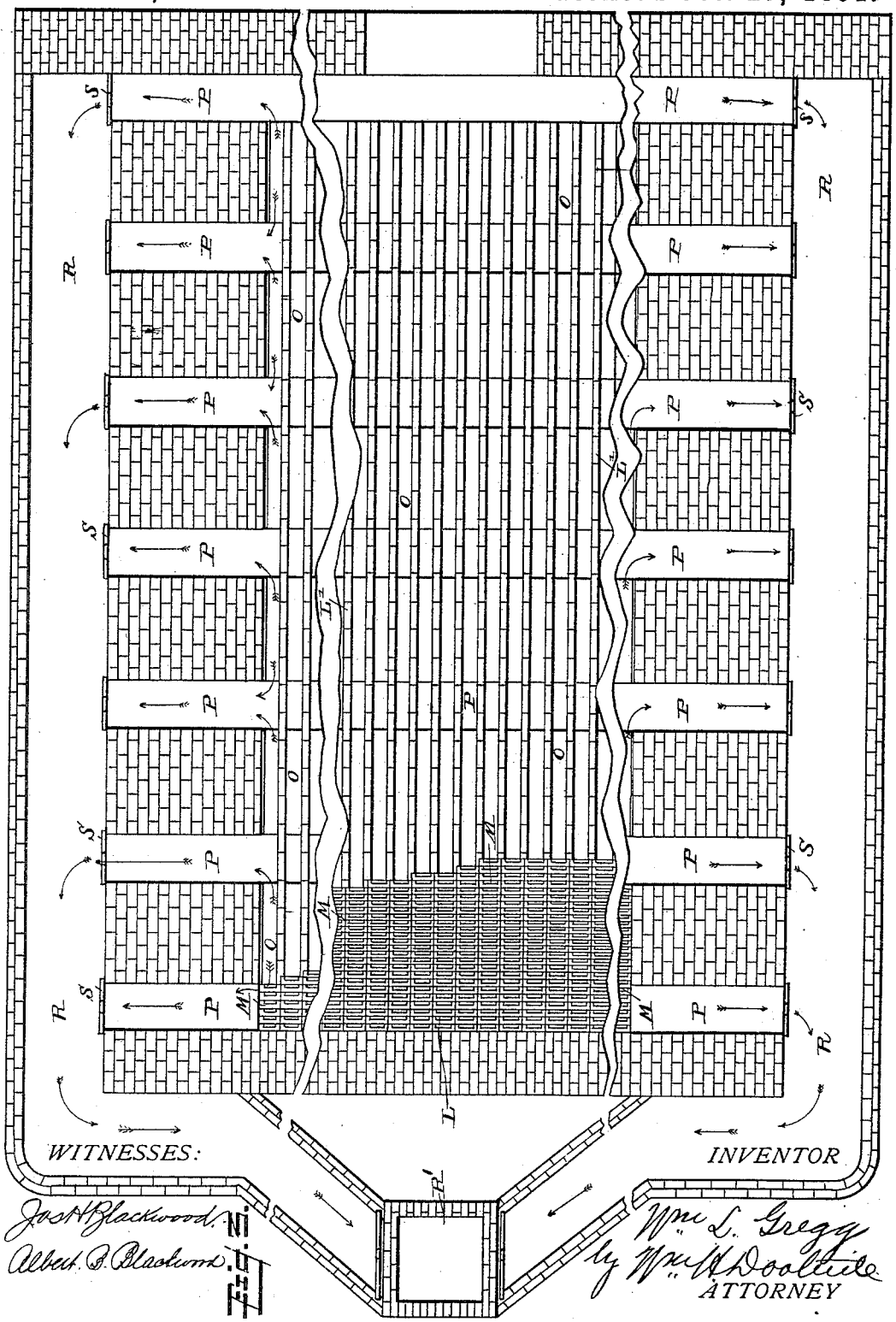
WITNESSES: INVENTOR
Wm. L. Gregg
ATTORNEY

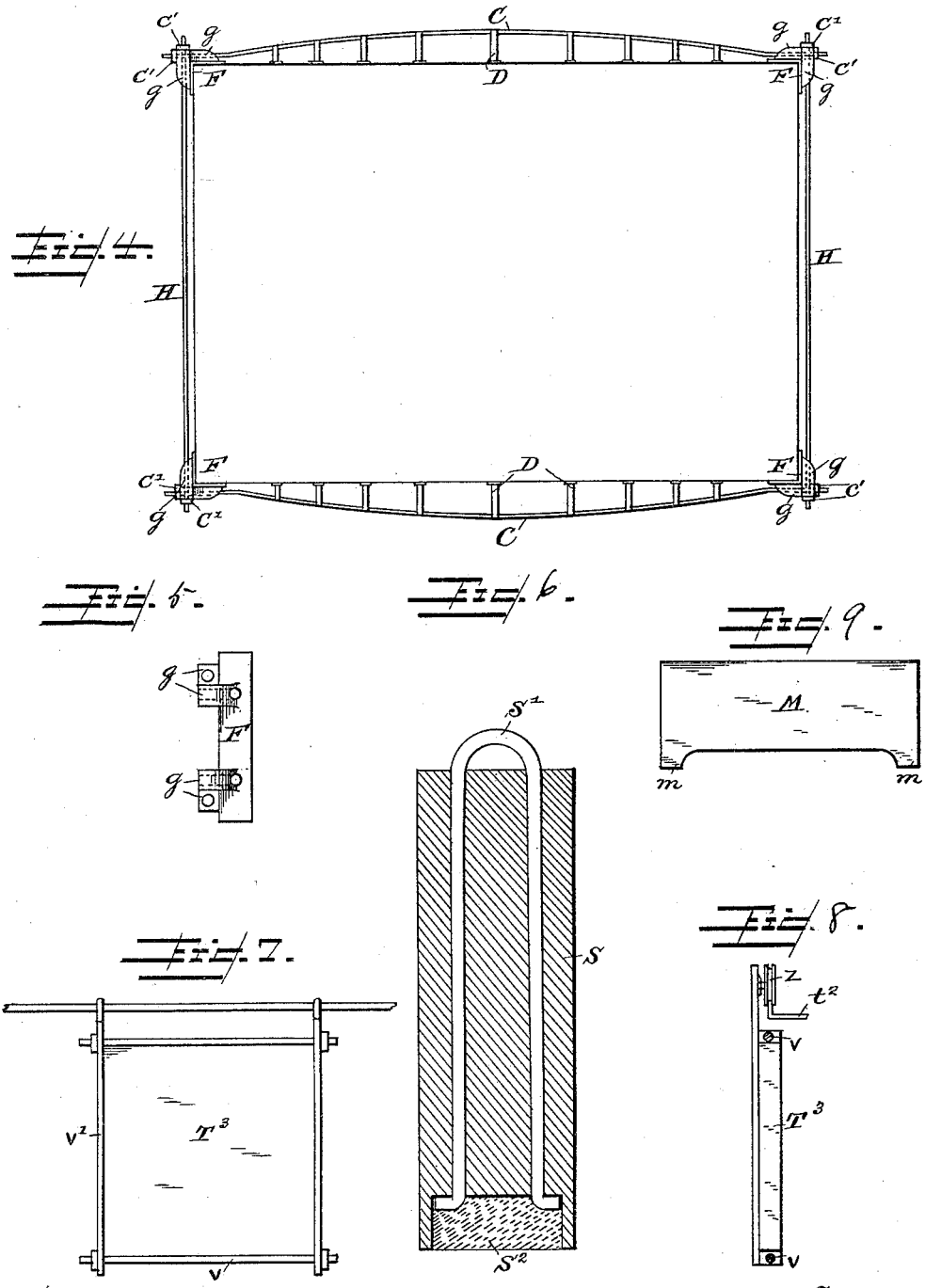

(No Model.) W. L. GREGG, Dec'd. 5 Sheets—Sheet 5.
H. L. GREGG, Executrix.
BRICK KILN.
No. 462,215. Patented Oct. 27, 1891.
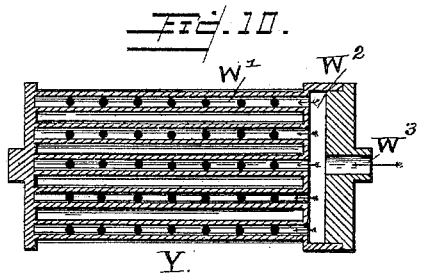
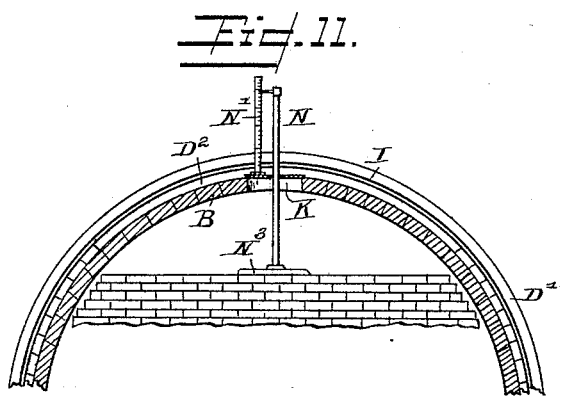
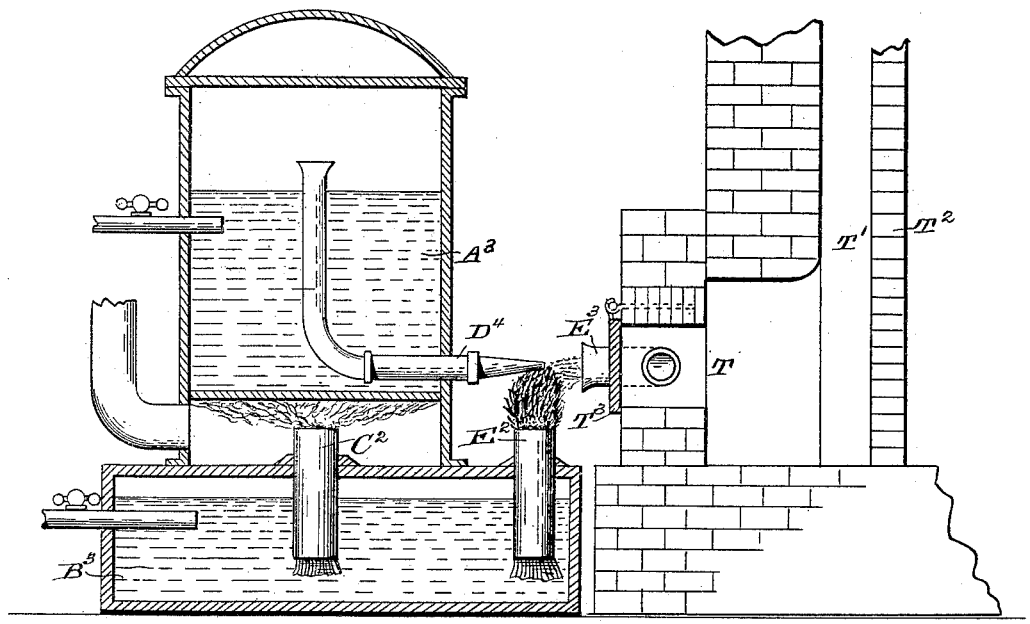
Witnesses
Jos H Blackwood
Albert B Blackwood
Inventor
Wm L Gregg
by Wm H Doolittle
Attorney

UNITED STATES PATENT OFFICE.

WILLIAM LAMPAS GREGG, OF PHILADELPHIA, PENNSYLVANIA; HARRIET LOUISE GREGG EXECUTRIX OF SAID WILLIAM LAMPAS GREGG, DECEASED.

BRICK-KILN.

SPECIFICATION forming part of Letters Patent No. 462,215, dated October 27, 1891.

Application filed March 18, 1890. Renewed July 22, 1891. Serial No. 400,283. (No model.)

*To all whom it may concern:*

Be it known that I, WILLIAM LAMPAS GREGG, a citizen of the United States, residing at Philadelphia, in the county of Philadelphia and State of Pennsylvania, have invented certain new and useful Improvements in Brick-Kilns; and I do hereby declare the following to be a full, clear, and exact description of the invention, such as will enable others skilled in the art to which it appertains to make and use the same.

My invention relates to improvements in downdraft-kilns; and the objects thereof are the construction of the simple but very strong construction, free from the well-known objections arising from the undue or sudden expansion and contraction of the walls and arch of a kiln while burning, the better utilization of hydrocarbons and natural gas as a source of heat, a more complete, uniform, and efficient production, regulation, and distribution of the heat within and through the kiln and its discharge therefrom, and simplified means of ascertaining the temperature of the kiln and condition of the brick while burning, all accomplished in the manner and by the instrumentalities hereinafter described, and particularly pointed out in the claims.

My improvements are illustrated in the accompany drawings, in which—

Figure 1 is a side elevation, partly in section; Fig. 2, a cross-section on line $xx$ of Fig. 1. Fig. 3 is a broken horizontal section; Fig. 4, a skeleton plan of truss-rod support for the walls of the kiln, and Fig. 5 a detail of the corner connections thereof; Fig. 6, detail of the damper; Fig. 7, a detail of the sliding furnace-door, and Fig. 8 a modification thereof; Fig. 9, a detail showing form of bricks composing the perforated floor; Fig. 10, a detail of hollow grate-bar; Fig. 11, a detail of the test float and gage and its connection with the kiln; and Fig. 12, a detail of hydrocarbon-burner in connection with a furnace.

Referring to the drawings, A A are the side walls of the kiln, and B the arch of semicircular form. The walls and arch are supported and braced against undue expansion or bulging by the following means: On each side of the wall and extending its entire length are placed two truss-rods C, held in brackets D secured in the wall. On each corner of the kiln are secured corner-plates F, each face of which is provided with two lugs $g$. Each of the ends of the rods C are passed through the lugs $g$, and is provided with a tightening-nut $c'$.

H are straight rods placed across the end walls of the kiln, extending into the lugs $g$ on the end face of the corner-plates, and also provided with tightening-nuts $c'$. I prefer to have a pair of these rods on each side and end of the kiln; but a greater or less number may be used, if found necessary or desirable.

For strengthening and supporting the arch I employ metallic bands I, preferably T shape. These bands are each anchored firmly into the side walls of the kiln and bear against a single course of bricks D' laid against the arch. The bearings D' extend up the arch about half-way to the top, leaving thus an open space the remainder of the way to the top of the arch between the bands and the arch. These bands are preferably placed six feet apart, and, extending over the top of the arch from the sides, as just described, a space $D^2$ is formed under the bands along the entire top of the arch. By this arrangement when bulging or expanding tends to take place, as it does where the curve of the arch commences above the side walls, such bulging or expansion at the points mentioned is prevented by the bands and their bearing, and taken up by the space $D^2$ over the top of the arch.

K are a series of openings along the top of the arch for the purpose of cooling off the kiln after burning and are each covered with a heavy tile during burning, which are removed when the kiln is to be cooled.

L is a perforated floor composed of bricks M of a peculiar form, as shown in Figs. 3 and 9. Each brick has one face cut out along its center, leaving ends $m$. The brick are laid on walls L', also made of brick, each end of a brick supported on a separate wall, and their projecting ends brought together at the top, forming a space or perforation which opens into the flues O, formed between the walls. The longitudinal flues O connect with the cross-flues P, the latter running beneath and at right angles with the former. Cross-flues P connect with outside longitudinal flues R and connect with stack or stacks R', which can be located at any desirable distance from the kiln.

S are dampers at each end of the cross-flues P for the purpose of regulating the distribution of heat—that is to say, the dampers on both sides being opened, if one side of the kiln should become too hot the dampers on that side can be closed, and the heat will thus be drawn to the opposite side.

The dampers S are made of soapstone, with an iron staple S' embedded and extending through it and turned up at the lower ends into a space $S^2$, formed on the soapstone, filled with fire-clay and baked hard, around the ends of the staple. They are hung by a wire rope, which extends over a pulley $p$ in a boxing $p^3$ and is connected to a counter-weight $p^4$.

T is a furnace built within the kiln, having a flue T' formed between a flash or bridge wall $T^2$ and the side wall of the kiln. $T^3$ is a door (shown in Fig. 7) for closing said furnace. This door is composed of soapstone to withstand the heat, inclosed in an iron frame composed of rods $v$ $v'$, secured together by nuts. The door is hung to a bar by hooks extending from rods $v'$, by which arrangement the door can be slid on said bar; or, as shown in the modification, Fig. 8, the door can be mounted to slide on small rollers 2 running on a suitable rail $t^2$. This is the preferable mode.

The grate $x$ may be of the ordinary form of furnace-grate for burning coal, but also may be of the form shown at Y in Fig. 10, which is made in sections of hollow perforated bars W', at the end of which is formed an air-chamber $W^2$, having a hollow journal $W^3$, by which means the sections are rocked and air supplied to the bars.

N is a test-gage put through the top of the arch, whereby the process of burning is indicated by its descent by the index N', which extends above the kiln, and which below is attached to a float $N^3$, resting on the mass of brick.

My kiln is adapted to be heated by other means than coal. For instance, a hydrocarbon-burner (illustrated in Fig. 12) may be employed. This embraces an oil-tank $B^3$, burners $C^2$ $E^2$, fed therefrom, a receiver $A^3$, situated above the burner $C^2$, a discharge-pipe $D^4$, the nozzle of which is placed in contact with the burner $E^2$, and by which a gasified liquid naphtha or other volatile hydrocarbon is injected over the oil-flame from burner $E^2$, producing great heat, and with such force as to convey the ignited gas through a flue or pipe $E^3$ to the furnace and into the kiln. Such hydrocarbon-burner may be located at any convenient distance from the kiln, and it may be used in conjunction with the coal-furnace to produce additional heat or separately. In a similar manner natural gas or any manufactured gas can be introduced into the kiln—namely, by a pipe from a source of heat leading into the furnace and directing the heat up over the bridge-wall.

It will be seen that by the bridge-wall being extended up and toward and not far below the curved wall of the arch the heat is carried first to the upper part of the kiln, where it strikes the arch and is directed thereby toward the top and center, throwing the heat well into the kiln. This arrangement—the furnaces being on both sides—insures a uniform distribution of heat through the kiln, the stack being of such height and construction as to insure a good downward draft through the perforated floor and into the discharge-flues.

$R^2$ are the usual peep-holes for inspecting the condition of the brick in the kiln while burning.

The course the heat takes is indicated by the arrows and is therefore not more specifically described.

Having thus described my invention, what I claim is—

1. In a downdraft brick-kiln chamber, the arch, in combination with the series of furnaces on both sides of the chamber, the flash or bridge walls, said walls extending up to the point where such arch begins, whereby heat is conducted from both sides of the chamber toward the upper part and center and well into the same, the perforated floor, the longitudinal flues beneath the floor, the cross-flues, the horizontal outside flues arranged at the sides of the kiln and extending from end to end thereof and connecting with the cross-flues, substantially as described.

2. In combination with cross-flues P and the outside longitudinal flues R, connected together, dampers controlling the passage of heat from said cross-flues to the outside flues, substantially as described.

In testimony whereof I affix my signature in presence of two witnesses.

WILLIAM LAMPAS GREGG.

Witnesses:
R. M. GREINER,
CHAS. H. FULLAWAY.